3,270,638
PHOTOMETRIC SYSTEM
Robert D. Anwyl and Dean M. Peterson, Rochester, N.Y., assignors to Eastman Kodak Company, Rochester, N.Y., a corporation of New Jersey
Filed July 22, 1963, Ser. No. 296,806
9 Claims. (Cl. 95—10)

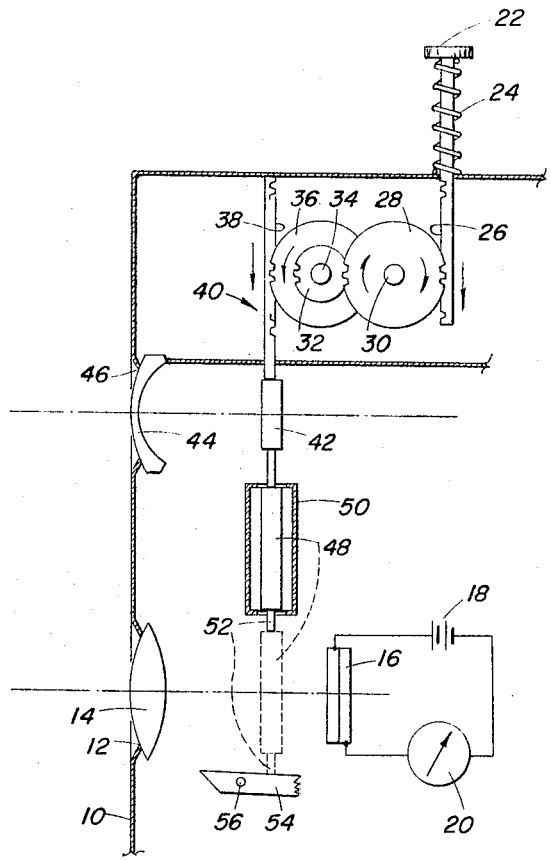

The present invention relates to photoelectric exposure control systems for cameras, and more particularly concerns automatic compensation of such systems for unusual scene lighting.

Exposure meters used on or in relation to cameras are designed to provide correct exposure for a broad variety of average scenes. These photometric devices are prone to "subject failure," the name generally applied to incorrect exposure determination for a subject of prime interest caused by an abnormal distribution of brightnesses within the scene being evaluated by the photometric device.

Perhaps the most common sense of such failure is strong backlighting, which results in underexposure for nearby objects. This invention constitutes a means for selectively recognizing such scenes and effecting a corresponding correction in the photometric system. Specifically, the invention comprises a photometric system wherein a phototropic element is placed in the beam of scene light which is incident on the photosensitive cell of an exposure meter. The phototropic element is, in effect, a filter whose optical density depends upon the intensity of incident ultraviolet radiation.

The change in optical density of such phototropic elements is commonly limited to certain wavelength bands. One phototropic material, for example, transmits substantially the entire visible spectrum until subjected to ultraviolet radiation, when its transmission becomes substantially limited to the blue end of the spectrum. Thus, in a conventionally lighted scene, where the amount of ultraviolet radiation reflected by most objects is relatively small, the phototropic filter remains substantially transparent to all visible radiation. In a strongly backlighted scene the amount of ultraviolet radiation usually is high, causing the phototropic filter to become more dense; the energy incident on the cell correspondingly less, and the overall exposure to be increased.

Accordingly, it is an important object of the invention to filter light incident on a photocell and to adjust such filtering automatically as a function of the intensity of ultraviolet radiation incident on the photocell. A related object is to adjust such filtering automatically as a function of the brightness of scene backlighting.

Another object of the invention is to employ a phototropic element for adjustably filtering light incident on a photocell.

A further object of the invention is to mask a phototropic element overlying a photocell and to remove such mask automatically in response to initial movement of a camera actuating member.

Other objects of the inventon will appear from the following description, reference being made to the accompanying drawings, which is a schematic side view of a typical camera embodying one form of the invention.

Referring to the drawing, a camera cover 10 has an aperture 12 in which a lens 14 is supported in alignment with a photocell 16. The photocell is illustrated as being of the photoconductive type connected in circuit with a battery 18 and an electric measuring instrument 20, but it will be understood that it may be a photovoltaic cell and that it may be used in any of a variety of circuits for automatically or semiautomatically controlling exposure in the camera or for indicating proper manual adjustment of an exposure control system.

A camera actuating member 22 is manually depressible against the tension of a spring 24 and has a rack 26 meshing with a gear 28 mounted on a shaft 30. Gear 28 meshes with a second gear 32 keyed to shaft 34 to which a third gear 36 also is keyed. Gear 36 meshes with a rack 38 formed on a slidably mounted control member 40. Rack 26, gears 28, 32 and 36 and rack 38 constitute a motion multiplier by means of which a relatively small depression of the actuating member 22 moves the control member downward through a relatively large distance.

A signal device 42 is connected to control member 40. When the control member is in its fully raised position as shown in the drawing in solid lines, the signal device is aligned with a viewfinder lens 44 mounted in an aperture 46 of the cover 10. Also mounted on the control device is a phototropic element 48, which is disposed within a light-shielding housing 50 when the control member 40 is in its initial position. The housing keeps element 48 substantially shielded from light and therefore maintains that element normally in a substantially transparent state.

Phototropic element 48 is of the type whose optical density varies in accordance with the amount of ultraviolet radiation impinging upon it. Some phototropic substances which are thus responsive to ultraviolet radiation are disclosed in U.S. Patent No. 1,845,835, issued February 16, 1932.

Initial depression of the actuating member 22 moves the control member 40 downward to move the signal device out of the viewfinder and to move the phototropic element 48 out of housing 50 and into alignment with lens 14 and cell 16, as shown in broken lines in the drawing. Movement of the signal device out of the finder indicates to the camera operator that the phototropic elements is aligned with the photocell. Full depression of actuating member 22 moves control member 40 further downward, where a tip 52 of the control member trips a shutter release member 54 pivoted at 56, while phototropic element 48 remains aligned with cell 16.

Element 48, which is exposed to scene light at this time, assumes a density that is a function of the intensity of ultraviolet radiation impinging thereon, and thereby controls the illumination of cell 16 by scene light. Light from a scene that includes bright backlighting normally includes a relatively high proportion of ultraviolet and therefore darkens element 48, causing the photocell 16 and instrument 20 to indicate and/or control the setting of a larger diaphragm aperture than otherwise would be established for the bright scene. This results in a more correct exposure of foreground objects, which usually is desired for such scenes.

Depending upon the time and density characteristics of the particular phototropic material used for element 48, it may be desirable to cover all of cell 16 with element 48, as illustrated in broken lines in the drawing, or to so cover only part of the cell, for example the top part of the cell (that part most likely to receive sky light from the scene).

The phototropic element also may occupy a fixed position covering the photocell, with an opaque mask normally covering both the element and the cell. In this case, the mask is removed before an exposure is made and may be removed by control member 40 in response to depression of the camera actuating member.

The invention has been described in detail with particular reference to preferred embodiments thereof, but it will be understood that variations and modifications can be effected within the spirit and scope of the invention as described hereinabove and as defined in the appended claims.

We claim:
1. In a camera of the type having means including a photocell for sensing scene brightness and means for controlling the exposure in accordance with the output of said photocell, a phototropic element being movably mounted to a position covering at least a part of said photocell, said phototropic element being sensitive mainly to energy of a particular wavelength, so that in operation the camera will give greater exposure to scenes which are highly illuminated by said particular wave length, than it will to scenes which are illuminated by radiation of other wave lengths.

2. A camera as claimed in claim 1 in which means are provided for moving said element into and out of a position for intercepting at least a part of said illumination.

3. In a camera having a photocell illuminatable by field light, and having means controlled by said photocell for regulating exposure of film in said camera; the improvement comprising a phototropic element movably mounted to a position in which at least a part of said field light passes through said element prior to illuminating said photocell said phototropic element being responsive mainly to ultra violet radiation.

4. The improvement defined in claim 3, wherein said element normally occupies a second position; with manually operable means for moving said element to said first-named position.

5. The improvement defined in claim 4, with means at said second position for substantially shielding said element from field light.

6. The improvement defined in claim 3, with: signal means movable in conjunction with movement of said element to apprise the camera operator of the position of said element.

7. The improvement defined in claim 6, with a viewfinder in which said signal means is visible in at least one position thereof.

8. In a camera having a photocell illuminatable by field light, and having means controlled by said photocell for regulating exposure of film in said camera, the improvement comprising a phototropic element movable to a position in which at least a part of said field light passes through said element prior to illuminating said photocell, said camera having a manually operable camera shutter actuating member, and means interrelating said actuating member and said element for moving the latter in response to operation of the former.

9. The improvement defined by claim 8 wherein said interrelating means includes a motion multiplier.

References Cited by the Examiner
UNITED STATES PATENTS

| | | |
|---|---|---|
| 2,824,235 | 2/1958 | Hahn et al. |
| 2,952,195 | 9/1960 | Babcock et al. _____ 88—113 X |
| 2,999,443 | 9/1961 | Miyauchi. |
| 3,094,053 | 6/1963 | Lieser _____ 95—10 |
| 3,174,537 | 3/1965 | Meyer. |
| 3,176,599 | 4/1965 | Anwyl _____ 95—10 |
| 3,205,803 | 9/1965 | Burgarella et al. _____ 95—10 X |

NORTON ANSHER, *Primary Examiner.*

J. F. PETERS, JR., *Assistant Examiner.*